Jan. 31, 1939.  W. BEUERMANN  2,145,286
DIRECTION FINDER
Filed March 10, 1937
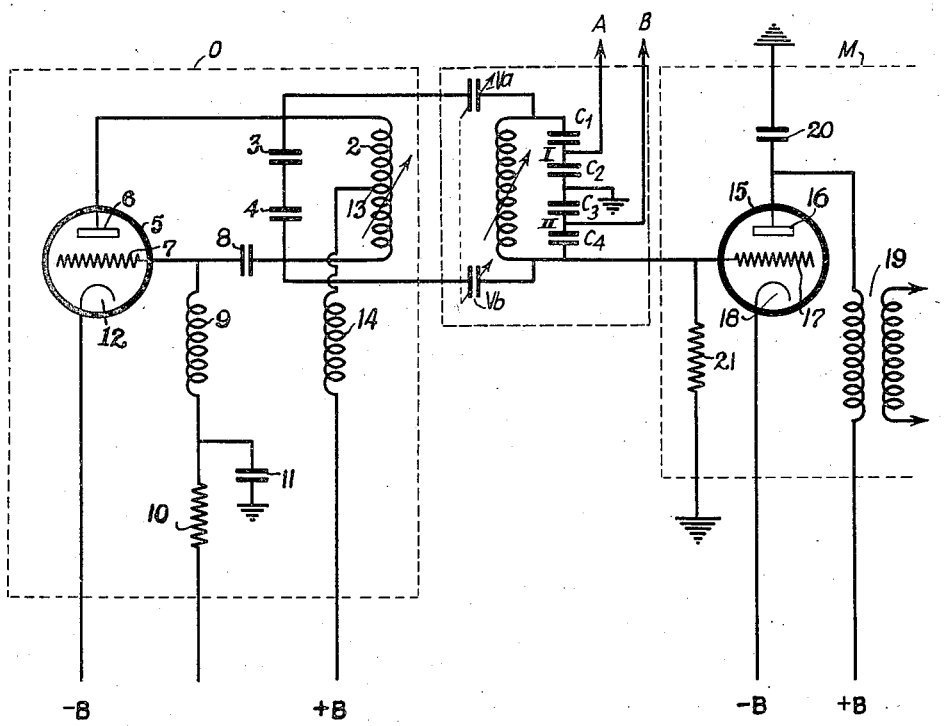
INVENTOR
WILHELM BEUERMANN
BY
ATTORNEY Patented Jan. 31, 1939

2,145,286

UNITED STATES PATENT OFFICE 2,145,286

DIRECTION FINDER

Wilhelm Beuermann, Berlin, Germany, assignor to Telefunken Gesellschaft für Drahtlose Telegraphie m. b. H., Berlin, Germany, a corporation of Germany Application March 10, 1937, Serial No. 130,008
In Germany February 19, 1936

6 Claims. (Cl. 250—11)

This invention relates to a receiver adapted to Adcock direction finding.

The present invention is concerned with certain embodiments of a direction finder outfit comprising an Adcock antenna.

It is known from the earlier art that the principle upon which the so-called Adcock direction finding is predicated consists in feeding to a joint receiver the incoming or signal potentials picked up in two aerials with a phase difference of 180 degrees. In this kind of arrangement, the medium perpendicular upon the connecting line of the two antennas points in the direction towards the transmitter. In this direction, the incoming signal strength is zero or of minimum value. The sharpness or accuracy of direction finding or in the taking of bearings with an Adcock outfit depends upon whether the potentials from the two antennae are absolutely the same and whether they are impressed upon the receiver with a phase difference of exactly 180 degrees.

In order that high sensitiveness may be obtained in an Adcock direction finder, the receiver as known in the art is made of the beat or heterodyne type. But the practical embodiment of such a receiver is attended with serious difficulties seeing that the demand, namely, that the potentials coming from the aerials should be exactly equal and opposite (present a phase angle of 180 degrees) is frustrated and defeated in the very receiver. In other words, the further demand must be made that the receiver should present the same sensitiveness as regards its two input terminals to which the antennae are connected. In order to fulfill this demand in connection with heterodyne receivers, the entire receiver must be built symmetric in reference to the input terminals in a way as well known from the prior art. And yet, even if the receiver is so built, it will exhibit slight disparity in sensitiveness as regards its input terminals. This discrepancy and defect, above all, may be sought in the fact that along the receiver circuit elements being a function of the frequency are included, and these in turn cause additional dissymmetry. Now, in order that perfect symmetry may be attained, the mixer tube circuit according to the invention is coupled with the heterodyne oscillator.

This coupling preferably is effected by virtue of capacitive means, and this capacitive coupling is made variable in such a way that a growth or increase of capacity in one half of the variable condenser will result in a decrease of capacity of the other half of the coupling.

An exemplified embodiment of a direction finder comprising Adcock aerials according to the invention is illustrated in the accompanying drawing. The two Adcock antennae leads A and B are so associated with the input circuit comprising the inductance L and the capacities $C_1$, $C_2$, $C_3$, and $C_4$ that the coupling conditions in reference to the central ground connection will be perfectly symmetric. Now, what is demanded is that the sensitiveness of the receiver in reference to the two input terminals I and II should be perfectly alike. To this end, according to the invention, the oscillator O comprises inductance 2. The outside ends are connected to the oscillator tuning condensers 3 and 4, the top outside end of inductance coil 2 being also connected to variable condenser $V_a$, and to the plate 6 of tube 5. The lower outside end of inductance coil 2 is connected to variable condenser $V_b$ and to grid 7 through series bypass condenser 8. A radio frequency choke 9 is connected in series with a bias resistance 10. A grid bypass condenser 11 is connected at a junction point between choke 9 and resistance 10. A cathode 12 connects to the negative side of the B voltage supply. A tap 13 on the inductance 2 connects through a plate choke 14 to the positive side of the B voltage supply and completes the plate circuit. Thus, the oscillator is bilaterally united with the grid input circuit or the mixer tube circuit M, which comprises tube 15 having an anode 16, grid 17 and cathode 18. Plate 16 connects an intermediate frequency transformer 19 and is bypassed to ground by condenser 20. Grid 17 is biased to ground by resistance 21. Cathode 18 connects to the negative side of a B voltage supply, and the primary of the intermediate frequency transformer connects to the positive side of the B voltage supply. For simplicity, the cathode voltage supply circuit of both the oscillator and mixer is omitted. The coupling relation between the oscillator and mixer is established in the drawing by the aid of the two variable capacities $a$ and $b$.

This bilateral connection of the oscillator and mixer alone will obviate coarse disparities in the sensitiveness of the input terminals. If, then, the coupling capacities $V_a$ and $V_b$ are made variable, this further will insure fine adjustment of the sensitiveness. The differential coupling insured by positively acting (interlock) means shown in the drawing prevents, in the presence of equality or balancing of amplitude, the oscillator potential at the grid of the mixer tube and thus absolute sensitiveness of the receiver from experiencing variations, seeing that by this arrangement the sum total of the capacities $Va$ and $Vb$ will be caused to stay always unvaried.

By the step here disclosed, it is possible to balance the very receiver as regards amplitude, without its overall sensitiveness being altered incidentally. However, it is also possible to compensate such differences in potential as originate from the very antenna system, say, as a result of dissymmetry of the two aerials.

What is claimed is:

1. A direction finder receiver of the heterodyne oscillator type adapted to receive signal potentials picked up by the Adcock principle comprising two antennae which are compared with each other for phase and amplitude, a heterodyne oscillator circuit, a mixer tube circuit coupled to said oscillator circuit by bilateral coupling means located between said oscillator circuit and said mixer circuit, and a pair of symmetrically arranged connections from said coupling means to each one of said antennae whereby symmetric coupling is established from said antennae to said oscillator and mixer circuits.

2. A direction finder receiver of the heterodyne oscillator type, adapted to receive signal potentials picked up by the Adcock principle comprising two antennae which are compared with each other for phase and amplitude, a heterodyne oscillator circuit, a mixer tube circuit coupled to said oscillator circuit by bilateral coupling means comprising a capacitive coupling device located between said oscillator circuit and said mixer circuit, and a pair of symmetrically arranged connections from said coupling device to each one of said antennae whereby symmetric coupling is established from said antennae to said oscillator and mixer circuits.

3. A direction finder receiver of the heterodyne oscillator type, adapted to receive signal potentials picked up by the Adcock principle comprising two antennae which are compared with each other for phase and amplitude, a heterodyne oscillator circuit, a mixer tube circuit coupled to said oscillator circuit by bilateral coupling means comprising a differential type capacitive coupling device located between said oscillator circuit and said mixer circuit, and a pair of symmetrically arranged connections from said coupling device to each one of said antennae whereby symmetric coupling is established from said antennae to said oscillator and mixer circuits.

4. A direction finder receiver of the heterodyne oscillator type adapted to receive signal potentials picked up by the Adcock principle comprising two antennae which are compared with each other for phase and amplitude, a heterodyne oscillator circuit, a mixer tube circuit coupled to said oscillator circuit by bilateral coupling means comprising a coupling device having an inductance and a plurality of capacitive elements between said oscillator circuit and said mixer circuit, and a pair of symmetrically arranged connections from said coupling device to each one of said antennae whereby symmetric coupling is established from said antennae to said oscillator and mixer circuits.

5. A direction finder receiver of the heterodyne oscillator type adapted to receive signal potentials picked up by the Adcock principle comprising two antennae which are compared with each other for phase and amplitude, a heterodyne oscillator circuit, a mixer tube circuit coupled to said oscillator circuit by bilateral coupling means comprising a coupling device having an inductance and a plurality of capacitive elements connected symmetrically with ground between said oscillator circuit and said mixer circuit, and a pair of symmetrically arranged connections taken off each side of ground from said coupling device and connected to each one of said antennae whereby symmetric coupling is established from said antennae to said oscillator and mixer circuit.

6. A direction finder receiver of the heterodyne oscillator type adapted to receive signal potentials picked up by the Adcock principle comprising two antennae which are compared with each other for phase and amplitude, a heterodyne oscillator circuit, a mixer tube circuit coupled to said oscillator circuit by bilateral coupling means comprising a coupling device having an inductance and a plurality of capacitive elements at least two of which are variable between said oscillator circuit and said mixer circuit, and a pair of symmetrically arranged connections from said coupling device to each one of said antennae whereby symmetric coupling is established from said antennae to said oscillator and mixer circuits.

WILHELM BEUERMANN.